(12) United States Patent
Wu

(10) Patent No.: US 12,385,647 B2
(45) Date of Patent: Aug. 12, 2025

(54) LIQUID FUEL STOVE

(71) Applicants: Jangport Oy, Helsinki (FI); Jianlin Wu, Changhua County (TW)

(72) Inventor: Jianlin Wu, Changhua County (TW)

( * ) Notice: Subject to any disclaimer, the term of this patent is extended or adjusted under 35 U.S.C. 154(b) by 429 days.

(21) Appl. No.: 18/005,818

(22) PCT Filed: Jul. 30, 2020

(86) PCT No.: PCT/FI2020/050512
§ 371 (c)(1),
(2) Date: Jan. 17, 2023

(87) PCT Pub. No.: WO2022/023617
PCT Pub. Date: Feb. 3, 2022

(65) Prior Publication Data
US 2023/0280039 A1   Sep. 7, 2023

(51) Int. Cl.
*F24C 5/06* (2021.01)
*F23D 3/18* (2006.01)

(52) U.S. Cl.
CPC . *F24C 5/06* (2013.01); *F23D 3/18* (2013.01)

(58) Field of Classification Search
CPC ...... F24C 5/06; F24C 5/04; F24C 5/12; F23D 3/18
See application file for complete search history.

(56) References Cited

FOREIGN PATENT DOCUMENTS

| | | | |
|---|---|---|---|
| CN | 2532370 Y | * | 1/2003 |
| CN | 107461738 B | | 4/2019 |
| FR | 2692653 A1 | | 12/1993 |
| JP | S5293378 U | | 7/1977 |
| TW | I628395 B | | 7/2018 |

OTHER PUBLICATIONS

ISA Finnish Patent and Registration Office, International Search Report Issued in Application No. PCT/FI2020/050512, Nov. 19, 2020, WIPO. 4 pages.
European Patent Office, Extended European Search Report Issued in Application No. 20947113.5, Mar. 13, 2024, Germany, 5 pages.

* cited by examiner

*Primary Examiner* — Jorge A Pereiro
(74) *Attorney, Agent, or Firm* — McCoy Russell LLP

(57) ABSTRACT

A liquid fuel stove comprising: a container, a base, a relief pipe, a control flame pipe, an adjustment structure, and multiple combustion structures; wherein the container is configured to accommodate liquid fuel and comprising an opening defined on a top thereof, the base is connectable with the container, the control flame pipe and the multiple combustion structures are mounted in the base, the multiple combustion structures are arranged around the control flame pipe, a bottom of the control flame pipe extends inside the container, a top of the control flame pipe extends above the base, and the control flame pipe comprising a heat connection part formed on a top thereof, the control flame pipe further comprising multiple primary vapor orifices passing through a wall of the control flame pipe and located between a top of the base and the heat connection part.

12 Claims, 9 Drawing Sheets

LIQUID FUEL STOVE

CROSS REFERENCE TO RELATED APPLICATION

The present application is a U.S. National Phase of International Application No. PCT/FI2020/050512 entitled "LIQUID FUEL STOVE," and filed on Jul. 30, 2020. The entire contents of the above-listed application are hereby incorporated by reference for all purposes.

FIELD OF THE INVENTION

The present invention relates to a stove, and more particularly to a liquid fuel stove.

BACKGROUND OF THE INVENTION

Liquid fuel stoves are stoves, such as cooking stoves, that use liquid fuel as a fuel. One such a stove is an alcohol stove, such as a cooking stove, that uses liquid alcohol as a fuel. Because the liquid fuel stove, such as the alcohol stove, and the liquid fuels, such as alcohol, are easy to carry, the liquid fuel stove, such as the alcohol stove, can be used as a stove for outdoor or table cooking, boiling drinking water, and the like.

A conventional liquid fuel stove is disclosed in TW Patent No. I628395 and contains a container, a base, a pipe, an adjustor, and a control pin. The container is configured to accommodate liquid fuel and has an opening formed on a top of the container. The base is mounted in the opening of the container. The pipe is fixed in the base, and the adjustor is rotatably fitted with the pipe. The pipe has multiple air orifices passing through it, and the adjustor has multiple tertiary vapor orifices passing through it. The base has multiple tubes surrounding the pipe, and the multiple tubes have multiple fourth air orifices formed on tops thereof respectively, wherein the multiple primary vapor orifices face to extensions of the tubes individually.

However, when vaporized fuel sprays out of the multiple tubes to produce a large flame, combustion air is acquired limitedly, so methanol or other fuel with a lower carbon number are applied. When the liquid fuel is higher ethanol, gasoline or other fuel with a high carbon number, the combustion air reduces, and the large flame cannot be burned completely, thus causing carbon deposits.

OBJECTIVE OF THE INVENTION

The present invention has arisen to mitigate and/or obviate the afore-described disadvantages.

The objective of the invention is to alleviate the disadvantages mentioned above. The objective of the present invention is to provide a liquid fuel stove which contains multiple main flame pipes configured to deliver combustible vapor and to enhance combustion efficiency.

SUMMARY

According to a first aspect, the present invention provides a liquid fuel stove comprising: a container, a base, a relief pipe, a control flame pipe, an adjustment structure, and multiple combustion structures. The container is configured to accommodate liquid fuel and comprising an opening defined on a top thereof, the base is connectable with the container, preferable inside the opening, the control flame pipe and the multiple combustion structures are mounted in the base, the multiple combustion structures may be arranged around the control flame pipe, a bottom of the control flame pipe extends inside the container, a top of the control flame pipe extends above the base, and the control flame pipe comprising a heat connection part formed on a top thereof, the control flame pipe further comprising multiple primary vapor orifices passing through a wall of the control flame pipe and located between a top of the base and the heat connection part, wherein the control flame pipe further comprising a primary wick accommodated therein, and the primary wick is made of heat resistant material, the adjustment structure is arranged on the control flame pipe and is configured to adjust small flames. The multiple combustion structures respectively comprising multiple vaporization pipes, multiple conduction plates, and multiple main flame pipes, wherein the multiple vaporization pipes are connected on the base, the multiple conduction plates are coupled with tops of the multiple vaporization pipes respectively, the multiple main flame pipes are connected with tops of the multiple conduction plates individually and have flame ports formed on tops of the multiple main flame pipes respectively, wherein the multiple conduction plates are respectively defined between the multiple vaporization pipes and the multiple main flame pipes which are adjacent to the control flame pipe, such that parts of heats of the small flames are conducted to the multiple vaporization pipes respectively so that the liquid fuel may vaporize and spray out of multiple tertiary air orifices, each thereof arranged to each of the multiple vaporization pipes, to shield the small flames and the multiple tertiary air orifices and to avoid the small flames being drawn into the multiple main flame pipes individually, wherein bottom of each the vaporization pipe extends inside the container and has a wick made of heat resistant material, the liquid fuel flows by capillary action into the vaporization pipe where it is heated into a combustible gas, which then flows to the main flame pipe, creating a large flame. The vaporization pipes comprise the wicks, and tertiary vapor orifices arranged at top ends of the vaporization pipes, so as to enhance flowing speed of gaseous fuel in the vaporization pipes and to absorb combustible vapor into the multiple main flame pipes.

The technical effect is that with at least some of the features mentioned above the liquid fuel stove the combustion efficiency of the liquid fuels can be enhanced. The invention provides a sound and a cost-effective solution for solving problems of the prior art. The liquid fuel stove is characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In an embodiment of the liquid fuel stove, the vaporization pipes may have end caps formed on their tops, and the wicks are adjacent to bottoms of the end caps, tertiary vapor orifices pass through the end caps so as to enhance flowing speed of gaseous fuel in the vaporization pipes and to absorb combustible vapor into the multiple main flame pipes. An advantage for this is that tops of the vaporization pipes are easy to cover with end caps and provided with tertiary vapor orifices. The structure enhances flowing speed of gaseous fuel in the vaporization pipes and absorbs combustible vapor into the multiple main flame pipes.

In an embodiment of the liquid fuel stove, the combustion structures may have at least one swirl element defined between the main flame pipes and the conduction plate so that the gaseous fuel and the combustion air produce a swirling and expanding flowing phenomenon. An advantage for this is that the gaseous fuel and the combustion air may hit at least one swirl element to produce a swirling and expanding flowing phenomenon by which a mixing evenness of the gaseous fuel and the combustion air is obtained, and mixed airs of the gaseous fuel and the combustion air flow in the main flame pipe evenly to enhance combustion efficiency.

In an embodiment of the liquid fuel stove, the adjustment structure may include a regulating part, a fitting ring, and a control pin, wherein the regulating part may be rotatably fitted on an outer wall of the control flame pipe, and the regulating part may include multiple apertures passing therethrough and located adjacent to the multiple primary vapor orifices respectively, wherein the fitting ring may be fitted with an outer wall of the regulating part, and a vapor chamber may be defined between the regulating part and the fitting ring, the adjustment structure may include multiple secondary air orifices passing therethrough, wherein the vapor chamber may be in communication with the multiple apertures and the multiple secondary air orifices, and the multiple secondary air orifices may face to the multiple combustion structures respectively adjacent to the control flame pipe.

In an embodiment of the liquid fuel stove, a heat conduction part may be defined among the control flame pipe and the multiple main flame pipes, a center of the heat conduction part may be fitted on the heat connection part, and the heat conduction part may be fitted with the multiple main flame pipes individually. An advantage for this is that when the small flames are adjustably extinguished, the heat conduction portion may conduct the heat to the control flame pipe and the fitting ring so as to maintain temperatures of the control flame pipe and the fitting ring which may be higher than a vaporization temperature. When desiring to light the small flames, the control structure may be rotated so that the multiple apertures communicate with the multiple primary vapor orifices individually, and the gaseous fuel may flow into and spray out of the vapor chamber to light the small flames easily after contacting with the large flame.

In an embodiment of the liquid fuel stove, the stove may further comprise a circular head arranged on top of the multiple main flame pipes and having a second vapor chamber in a circle shape, wherein the second vapor chamber may be in communication with the multiple combustion structures, and the circular head may have an air gap formed around an outer rim of a top of the circular head and communicating with the second vapor chamber, such that mixed airs of the gaseous fuel and the combustion air may flow into the second chamber from the multiple main flame pipes, and the mixed airs may flow out of the air gap. An advantage for this is that it provides a further alternative for the structure of the liquid fuel stove.

In an embodiment of the liquid fuel stove, the control flame pipe may further include a control flame pipe insulation sleeve fitted inside the container, and the multiple vaporization pipes further include multiple vaporization pipe insulation sleeves fitted inside the container. An advantage for this is that the control flame pipe insulation sleeve and multiple vaporization pipe insulation sleeves help reduce heat energy conducted to the liquid fuel in the container.

In an embodiment of the liquid fuel stove, the liquid stove may further comprise multiple relief pipes and wherein multiple ducts may be connected on tops of the multiple relief pipes respectively so that the multiple ducts may guide the gaseous fuel to flow upward via the multiple relief pipes. An advantage of this is that multiple relief pipes may help to maintain the pressure of the space of container within the safe range.

In an embodiment of the liquid fuel stove, the liquid stove may further comprise multiple relief pipes and wherein multiple connection pipes may be connected with tops of the multiple relief pipes and communicate with the multiple tertiary air orifices respectively, wherein the gaseous fuel may spray out of the multiple tertiary air orifices from the multiple relief pipes via the multiple connection pipes individually. An advantage of this is that it may be able to recycle the gaseous fuel from the multiple relief pipes and enhancing utilization rate of the gaseous fuel.

In an embodiment of the liquid fuel stove, the relief pipe may be rotatably mounted on the base and may be in communication with the container. An advantage for this is that the relief pipes are easy to install and control.

In an embodiment of the liquid fuel stove, the control flame pipe and the multiple combustion structures may be rotatably mounted in the base. An advantage for this is that the rotatably mounted control flame pipe and the multiple combustion structures are easy to install, adjust and control.

In an embodiment of the liquid fuel stove, the multiple combustion structures may be oppositely arranged around the control flame pipe. An advantage for this is that this feature helps to make the structure of the liquid fluid stove efficient and cost effective.

Thereby, the multiple combustion structures facilitate the combustion air to flow into the multiple main flame pipes. The flowing speed of the gaseous fuel to the multiple main flame pipes via the multiple tertiary vapor orifices are increased. By using the multiple tertiary vapor orifices so as to absorb the combustion air into the multiple main flame pipes to mix with the gaseous fuel, thus enhancing the combustion efficiency of the liquid fuel.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
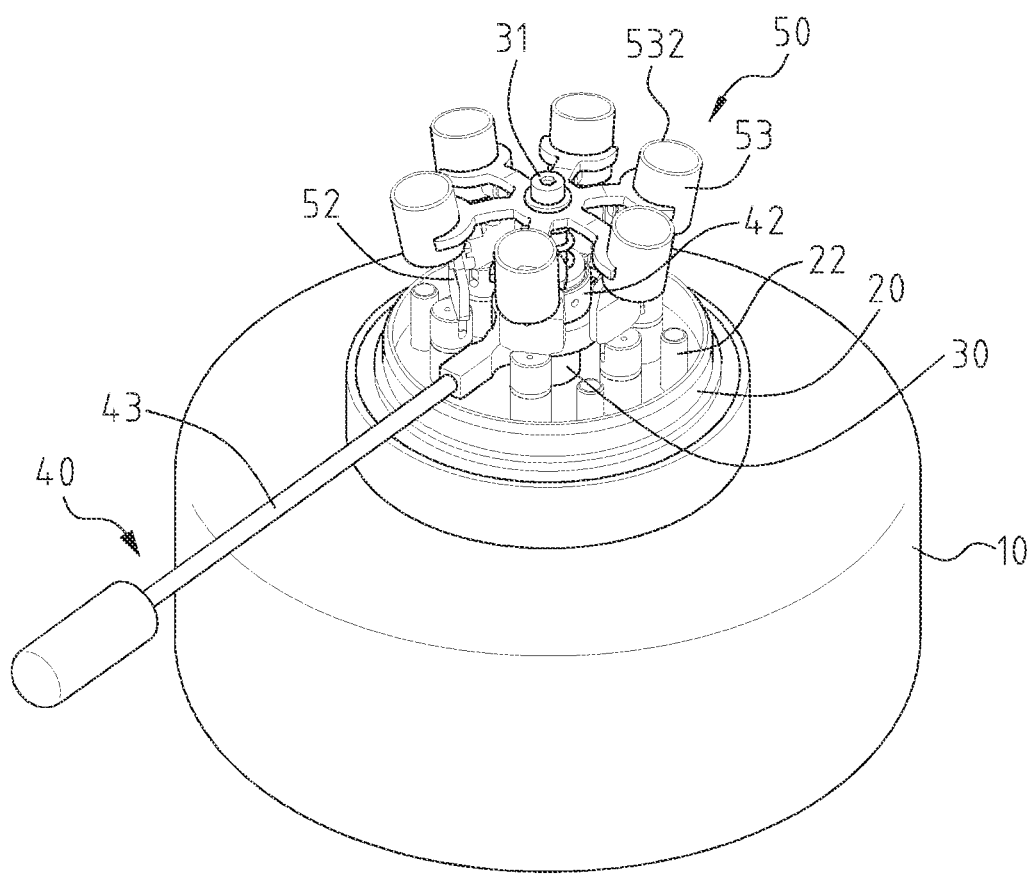
FIG. 1 is a perspective view showing the assembly of a liquid fuel stove according to a first embodiment of the present invention.
Figure 2:
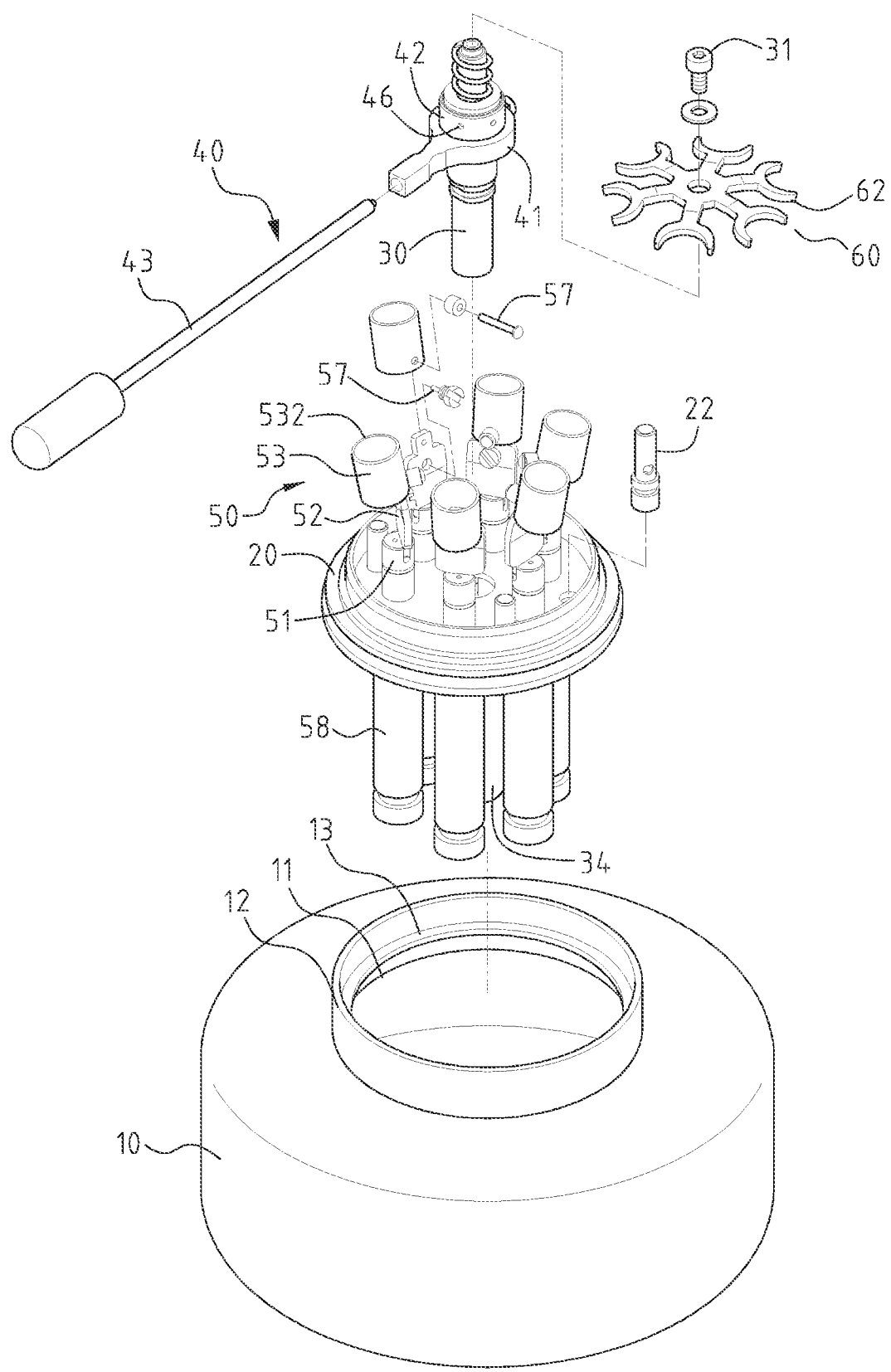
FIG. 2 is a perspective view showing the exploded components of the liquid fuel stove according to the first embodiment of the present invention.
Figure 3:
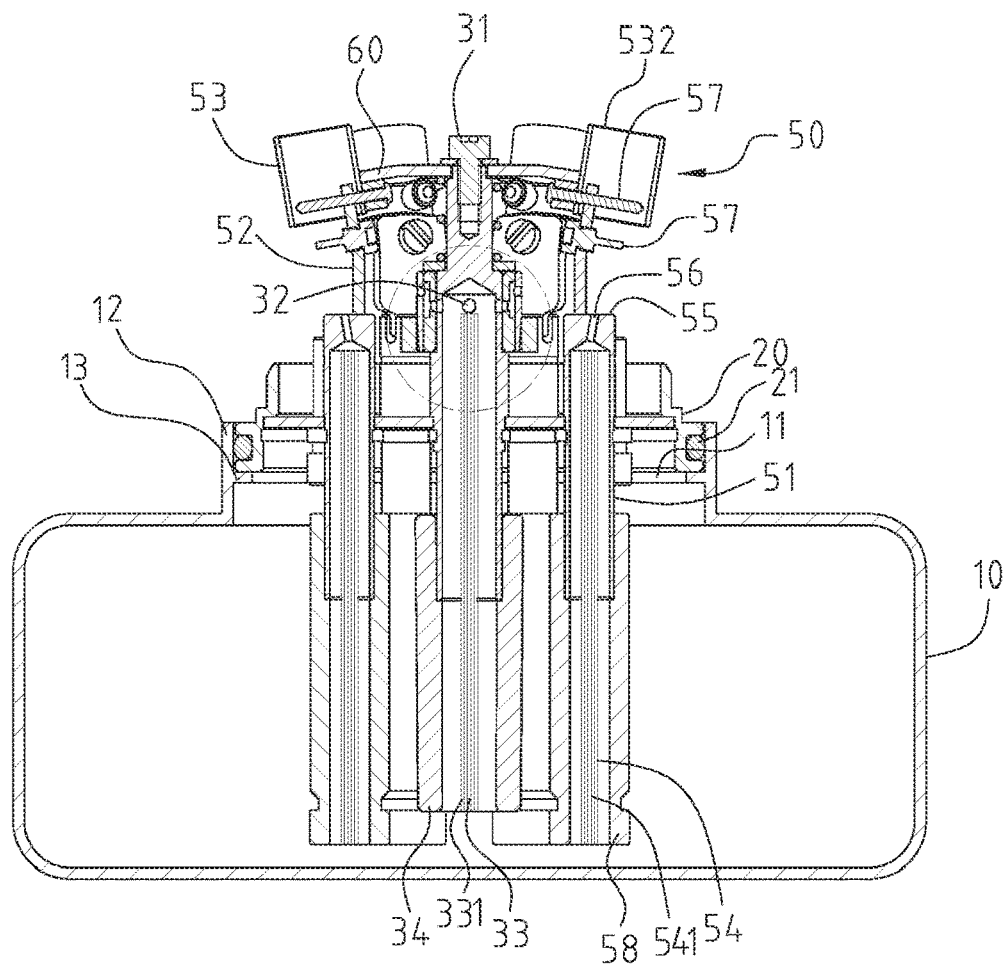
FIG. 3 is a cross sectional view showing the assembly of the liquid fuel stove according to the first embodiment of the present invention.
Figure 4:
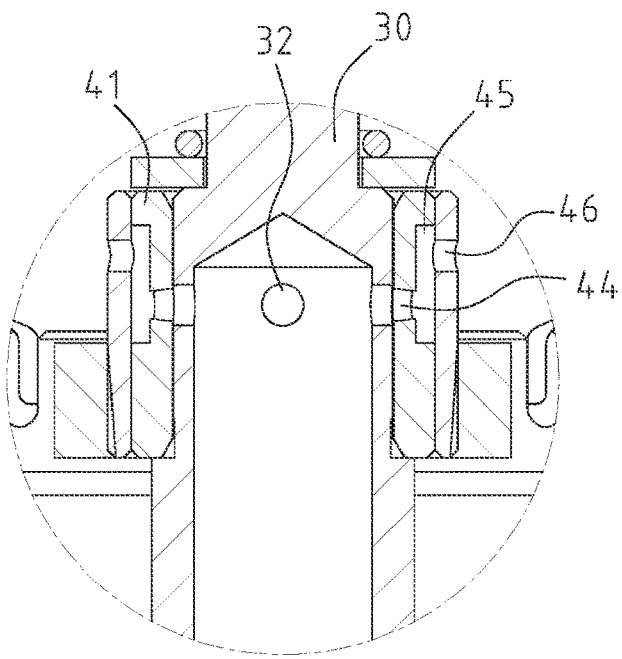
FIG. 4 is a magnified cross-sectional view of a part of FIG. 3.

FIGS. 1-4 show a liquid fuel stove according to an embodiment of the present invention. The embodiment may be a preferred embodiment of the invention. In an embodiment the liquid fuel stove may comprise: a container 10, a base 20, at least one relief pipe 22, a control flame pipe 30, a control structure 40, and multiple combustion structures 50.

The container 10 is configured to accommodate liquid fuels. In an embodiment the liquid fuel may be any one of alcohol, methanol, ethanol, kerosene, gasoline, and vaporized liquid combustible. The container 10 comprises an opening 11. The opening may be arranged on a top of the container 10. In an embodiment the base 20 may be arranged to be connected on the opening 11. The base 20 may be arranged on a mouth 12 of the opening 11. In an embodiment the base 20 may be arranged sealedly on a mouth 12 of the opening 11. In an embodiment the container may have a receiving means for receiving counter means of the base 20 for connecting the base 20 to the container 10. In an embodiment the base 20 may be connected inside of the mouth 12 of the opening 11. In an embodiment the mouth 12 of the opening 11 may comprise a cylindrical wall extending outwards from the wall of the container 10. In an embodiment the cylindrical wall may comprise a flange 13 arranged to extend from an inner side surface of the cylindrical wall. The flange may be arranged to support the base 20 when the base being mounted on the mouth of the opening of the container. In an embodiment the base 20 may comprise a sealing means 21, such as an O-ring or other sealing means, facing to an inner surface of the mouth of the container opening 11, for sealing the connection between the container 10 and the base 20. In an embodiment a groove for the sealing 21 may be arranged on an outer edge of the base 20. The base 20 may be placed on the flange 13 of the mouth 12 of the container. In an embodiment a relief pipe 22 may be mounted in the base 20. In an embodiment the relief pipe may be arranged rotatably in the base. In an embodiment multiple relief pipes 22 may be mounted rotatably in the base. In an embodiment the control flame pipe 30 may be arranged in the base 20. In an embodiment the control flame pipe may be rotatable mounted in the base. In an embodiment the multiple combustion structures 50 are rotatably mounted in the base 20. In an embodiment the liquid fuel may flow out of the multiple combustion structures 50 from the container 10 via the control flame pipe 30 individually, thus producing small flames and large flame. The control structure 40 may be arranged on the control flame pipe 30 so as to adjust the small flames. The multiple combustion structures 50 may be oppositely arranged around the control flame pipe 30.

The control flame pipe 30 may have a bottom and a top. In an embodiment the bottom of the control flame pipe 30 extends inside the container 10. The bottom of the control flame pipe may be arranged adjacent to a bottom of the container 10. The top of the control flame pipe 30 extends above the base 20. The control flame pipe 30 may comprise a heat conduction portion 31 formed on a top thereof. The control flame pipe 30 may comprise multiple primary vapor orifices 32 passing through a wall of the control flame pipe 30 and located between a top of the base 20 and the heat conduction portion 31. In an embodiment, the multiple primary vapor orifices 32 may be radially formed around a center of the control flame pipe 30. The control flame pipe 30 may comprise a primary wick 33 accommodated therein. The primary wick 33 may be made of heat resistant material. In an embodiment, a bottom of the primary wick 33 may be extending on the bottom of the control flame pipe 30. In an embodiment, top of the primary wick 33 may be extending to proximate to the multiple primary vapor orifices 32. The control flame pipe 30 may further comprise multiple channels 331 formed by the primary wick 33 so that the liquid fuel may flow to the top of the primary wick 33 from the container 10 along the multiple channels individually. In an embodiment the wick 33 may be made (but not limited to) of one or more of the following: natural fibers, inorganic fibers, porous materials, capillaries, various material structures with capillary principles. The control flame pipe 30 may further comprise a control flame pipe insulation sleeve 34 fitted inside the container 10. In an embodiment, the control flame pipe insulation sleeve 34 may be arranged to lower end of the control flame pipe 30. In an embodiment, the control flame pipe insulation sleeve 34 may be arranged to form a part of the control flame pipe.

In an embodiment, the control structure 40 may comprise a regulating part 41, a fitting ring 42, and a control pin 43. The regulating part 41 may be rotatably fitted on an outer wall of the control flame pipe 30. The regulating part 41 may comprise multiple apertures 44 passing therethrough and located adjacent to the multiple primary vapor orifices 32 respectively. The fitting ring 42 may be fitted with an outer wall of the regulating part 41. A vapor chamber 45 may be defined between the regulating part 41 and the fitting ring 42. The control structure 40 may comprise multiple secondary vapor orifices 46 passing therethrough. The vapor chamber 45 may be arranged in communication with the multiple apertures 44 and the multiple secondary vapor orifices 46. The multiple secondary vapor orifices 46 may be arranged to face to the multiple combustion structures 50 respectively adjacent to the control flame pipe 30. In an embodiment after the liquid fuel vaporizes into gaseous fuel, it may flow into the vapor chamber 45 via the multiple primary vapor orifices 32 and the multiple apertures 44 and discharge out of the fitting ring 42 via the multiple secondary vapor orifices 46. The control pin 43 may be connected with the regulating part 41 and may stop reciprocating rotation of the regulating part 41 so that the multiple primary vapor orifices 32 may communicate with the multiple apertures 44 to change a size of flowing paths of the gaseous fuel through the multiple primary vapor orifices 32 and the multiple apertures 44, thus changing flow of the gaseous fuel from the vapor chamber 45 via the multiple secondary vapor orifices 46.

The control pin 43 may be operated to stop rotation of the fitting ring 42 so that the multiple primary vapor orifices 32 communicate with the multiple apertures 44, the gaseous fuel may flow out of the multiple secondary vapor orifices 46 from the control flame pipe 30 via the vapor chamber 45 individually. The fitting ring 42 may be heated by using a lighter or an ignition to evaporate the gaseous fuel, hence the gaseous fuel may spray out of the multiple secondary vapor orifices 46 to produce small flames, and the small flames heat multiple combustion structures 50 respectively, thus outputting the large flame. Accordingly, the control pin 43 may be operated to stop the rotation of the fitting ring 42 reciprocatively so as to change the flow of the gaseous fuel from the vapor chamber 45 via the multiple secondary vapor orifices 46. In an embodiment, preferably, the vapor chamber 45 may produce equalized buffer space so that the gaseous fuel may flow into the vapor chamber 45 from the control flame pipe 30. In an embodiment in which flowing speed and dynamic pressure of the gaseous fuel are not consistent, pressures of the vapor chamber 45 may urge the small flames for heating the multiple combustion structures 50 to be consistent so that the gaseous fuel may not flow quickly because a connection area of the multiple primary vapor orifices 32 and the multiple apertures 44 is small, thus avoiding extinguishment of the small flames. In a case when errors may occur between the multiple primary vapor orifices 32 and the multiple apertures 44 because of poor machining or connecting precision or the multiple primary vapor orifices 32 may not connect with the multiple apertures 44 accurately, flowing speeds and dynamic pressures of the gaseous fuel may not be consistent, pressures of the vapor chamber 45 may urge the small flames for heating the multiple combustion structures 50 to be consistent so that the gaseous fuel may not flow quickly because a connection area of the multiple primary vapor orifices 32 and the multiple apertures 44 is small, thus avoiding extinguishment of the small flames.

In an embodiment the multiple combustion structures 50 may respectively comprise multiple vaporization pipes 51, multiple conduction plates 52, and multiple main flame pipes 53. The multiple vaporization pipes 51 may be connected on the base 20. The multiple conduction plates 52 may be coupled with tops of the multiple vaporization pipes 51 respectively. The multiple main flame pipes 53 may be connected with tops of the multiple conduction plates 52 individually. The multiple main flame pipes 53 may have flame ports 532 formed on tops thereof respectively. The multiple conduction plates 52 may be respectively defined between the multiple vaporization pipes 51 and the multiple main flame pipes 53. The multiple combustion structures 50 or parts thereof, e. g. the multiple conduction plates 52, may be arranged adjacent to the control flame pipe 30, such that some of the heat of the small flames is conducted to the multiple vaporization pipes 51 respectively. The liquid fuel may vaporize and spray out of multiple tertiary vapor orifices 56. The multiple combustion structures 50 or parts thereof, e. g. the multiple conduction plates 52, may be arranged to shield the small flames and the multiple tertiary vapor orifices 56. In an embodiment the multiple combustion structures 50 or parts thereof, e. g. the multiple conduction plates 52, may be arranged to avoid the small flames being drawn into the multiple main flame pipes 53 individually, and the vaporized fuel sprays to the multiple main flame pipes 53 respectively. In an embodiment the vaporization pipes may extend inside the container 10. Bottoms of the multiple vaporization pipes 51 may extend inside the container 10. In an embodiment, the multiple vaporization pipes 51 may have one or multiple wicks 54 made of heat resistant material. In an embodiment the wick 51 may be made (but not limited to) of one or more of the following: natural fibers, inorganic fibers, porous materials, capillaries, various material structures with capillary principles. In an embodiment each of the multiple vaporization pipes 51 may be arranged to comprise a wick 54. In an embodiment the wick 54 may be arranged to comprise a passage 541 or multiple passages configured to allow a flow or flows of the liquid fuel from the container by capillary action from a bottom of the wick to a top of the wick. In an embodiment the multiple vaporization pipes 51 may further comprise multiple passages 541 formed by the multiple wicks 54 individually so that the liquid fuel flows by capillary action to the tops of the multiple wicks 54 from the container 10 along the multiple passages. The multiple vaporization pipes 51 may further comprise multiple vaporization pipe insulation sleeves 58 fitted inside the container 10.

In an embodiment the vaporization pipe 51 may comprise an end cap 55 formed on a top end. The wick 54 may be arranged to extend adjacent to bottom of the end cap 55. A tertiary vapor orifice 56 may be arranged to the end cap 55. The tertiary vapor orifice 56 may be directed to the to the main flame pipe 53. In an embodiment the flowing speed of the gaseous fuel in the vaporization pipe 51 may be enhanced, and the gaseous fuel may absorb combustion air into the main flame pipe 53 from an external environment. The gaseous fuel may burn in the flame port 532 to produce the large flame, thus enhancing combustion efficiency of the liquid fuel. In an embodiment the multiple vaporization pipes 51 may have multiple end caps 55 formed on tops thereof respectively, and the multiple wicks 54 are adjacent to bottoms of the multiple end caps 55 individually, centers of the multiple end caps 55 pass through the multiple tertiary vapor orifices 56 so as to enhance flowing speeds of the gaseous fuel in the multiple vaporization pipes 51 individually, and the gaseous fuel may absorb combustion air into the multiple main flame pipes 53 from an external environment, wherein the gaseous fuel may burn in the flame ports 532 to produce the large flame, thus enhancing combustion efficiency of the liquid fuel.

In an embodiment the combustion structure 50 may comprise at least one swirl element 57. In an embodiment the at least one swirl element 57 may be arranged in a space between the tertiary vapor orifice 56 and the flame port 532. The gaseous fuel and the combustion air may hit at least one swirl element 57 to produce a swirling and expandable flowing phenomenon by which a mixing evenness of the gaseous fuel and the combustion air is obtained, and mixed airs of the gaseous fuel and the combustion air may flow in the main flame pipe 53 evenly to enhance combustion efficiency.

In an embodiment the multiple combustion structures 50 may comprise at least one swirl element 57 defined between the multiple main flame pipes 53 and the multiple conduction plates 52 so that the gaseous fuel and the combustion air may hit at least one swirl element 57 to produce a swirling and expanding flowing phenomenon by which a mixing evenness of the gaseous fuel and the combustion air may be obtained, and mixed airs of the gaseous fuel and the combustion air may flow in the multiple main flame pipes 53 evenly to enhance combustion efficiency.

In an embodiment at least one swirl element 57 may be a bar, a cross section of which is in a circle shape or other shapes. In an embodiment the at least one swirl element 57 may in other shapes instead of the bar. In an embodiment of FIGS. 2 and 3 there may be arranged a plurality of swirl elements 57 in each combustion structures comprising the main flame pipe 53 and the conduction plate 52.

In an embodiment a heat conduction part 60 may be defined among the control flame pipe 30 and the multiple main flame pipes 53. A center of the heat conduction part 60 may be fitted on the heat conduction portion 31. The heat conduction part 60 may comprise multiple arcuate portions 62 arranged around an outer rim thereof. The heat conduction part 60 may be fitted, e.g. from the multiple arcuate portions 62, with the multiple main flame pipes 53 individually, such that the heat conduction part 60 receives and conducts some of the heat from the small flames and a part of the large flame to the multiple main flame pipes 53 and the heat conduction portion 31 individually, and the heat conduction portion 31 conducts the heat to the control flame pipe 30. When the small flames are adjustably extinguished, the heat conduction portion 31 may conduct the heat to the control flame pipe 30 and the fitting ring 42 so as to maintain temperatures of the control flame pipe 30 and the fitting ring 42 which are higher than a vaporization temperature. When desiring to light the small flames, the control structure 40 may be rotated so that the multiple apertures 44 communicate with the multiple primary vapor orifices 32 individually, and the gaseous fuel may flow into and spray out of the vapor chamber 45 to light the small flames easily after contacting with the large flame.

The control flame pipe insulation sleeve 34 is configured to reduce heat energy of the control flame pipe 30 conducted to the liquid fuel in the container 10. The multiple tertiary vapor orifices 56 and/or the multiple vaporization pipe insulation sleeves 58 may be configured to reduce heat energy of the multiple vaporization pipes 51 conducted to the liquid fuel in the container 10. Hence a pressure of the container 10 may be maintained within a safe range after the liquid fuel in the container 10 reach a boiling point to enhance stability and safety when outputting the large flame and the small flames.

In an embodiment the relief pipe 22 or the multiple relief pipes 22 may be in communication with the container 10 and the base 20, such that the heat energies of the control flame pipe 30 and the multiple vaporization pipes 51 may be conducted to the liquid fuel in the container 10 so as to enhance the temperature of the container 10, and the gaseous fuel may evaporate above the liquid fuel. A pressure of the space of the container 10 above the liquid fuel may be released by ways of the relief pipe 22 or the multiple relief pipes 22, thus maintaining the pressure of the space of container within the safe range.

The multiple combustion structures 50 facilitate the combustion air to flow into the multiple main flame pipes 53, and the flowing speeds of the gaseous fuel to the multiple main flame pipes 53 via the multiple tertiary vapor orifices 56 may be increased by using the multiple end caps 55 and the multiple tertiary vapor orifices 56 so as to absorb the combustion air into the multiple main flame pipes 53 to mix with the gaseous fuels, thus enhancing the combustion efficiency of the liquid fuels. Preferably, when the liquid fuel is ethanol, gasoline, or other fuel with higher carbon number, the combustion efficiency of the liquid fuel may be maintained. Preferably, when carbon deposits occur or carbide adheres on the multiple main flame pipes 53, it is easy to clean the multiple main flame pipes 53.

In an embodiment the multiple main flame pipes 53 may be arranged to tilt away from the control flame pipe 30.

Figure 5:
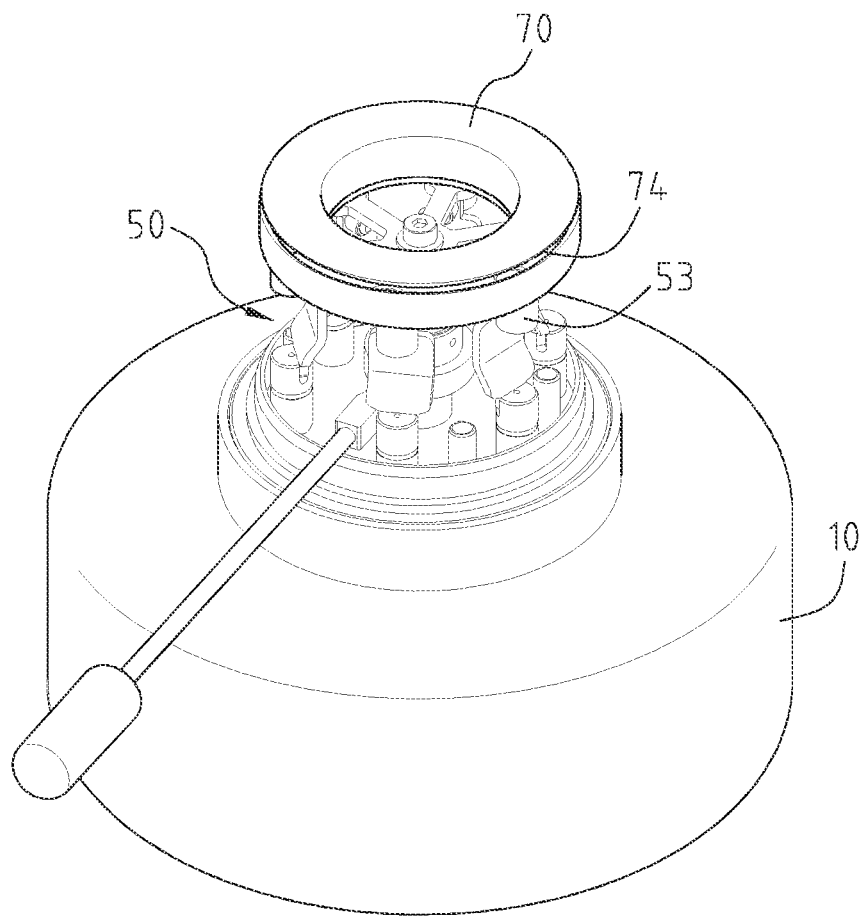
FIG. 5 is a perspective view showing the assembly of a liquid fuel stove according to a second embodiment of the present invention.
Figure 6:
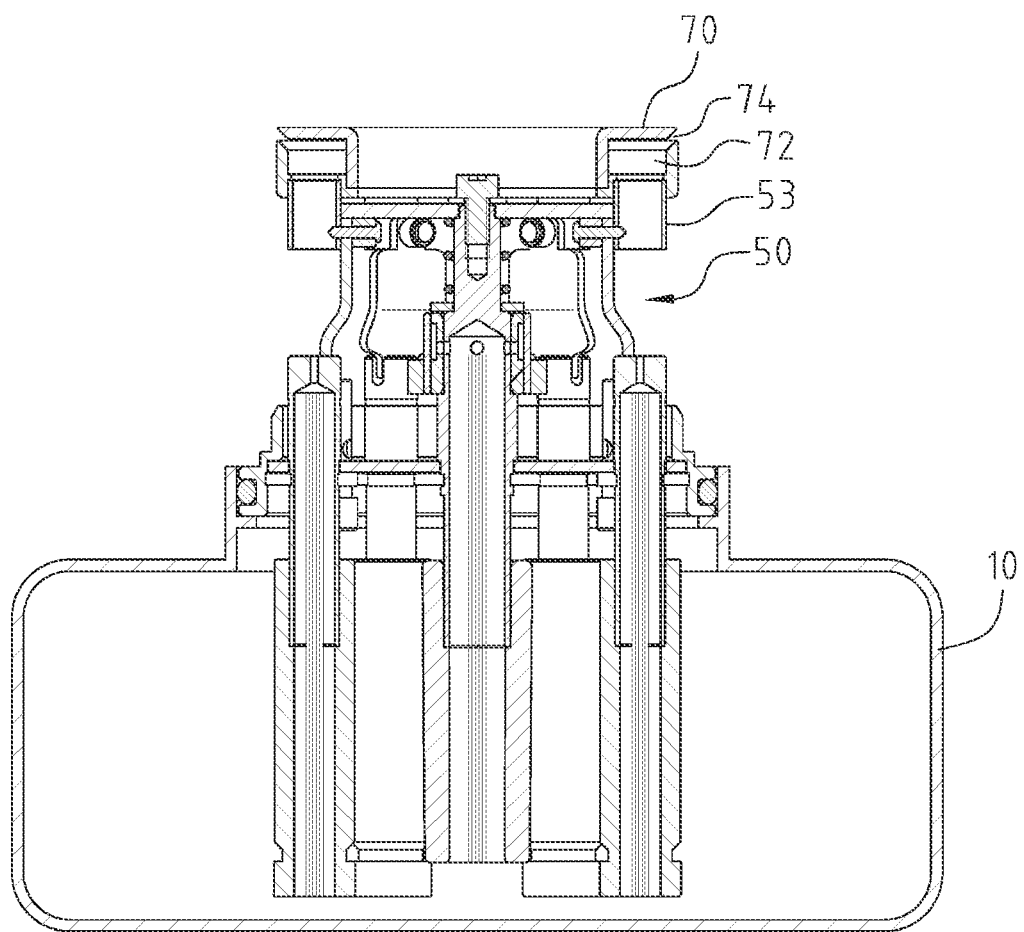
FIG. 6 is a cross sectional view showing the assembly of the liquid fuel stove according to the second embodiment of the present invention.

FIGS. 5 and 6 show a second embodiment a liquid fuel stove. A difference of a liquid fuel stove of a second embodiment from that of the first embodiment may comprise: a circular head 70 may be arranged on tops of multiple main flame pipes 53 and may have a second vapor chamber 72 in a circle shape. The second vapor chamber 72 may be in communication with the multiple combustion structures 50. The circular head 70 may have an air gap 74 formed around an outer rim of a top of the circular head 70 and communicating with the second vapor chamber 72. The mixed airs of the gaseous fuel and the combustion air may flow into the second chamber 72 from the multiple main flame pipes 53, and the mixed airs flow out of the air gap 74 via the second chamber 72, thus lighting a circular large flame.

When the mixed airs flow into the second vapor chamber 72, they may contact with a peripheral wall and a top of the second vapor chamber 72, thus enhancing the combustion efficiency.

Figure 7:
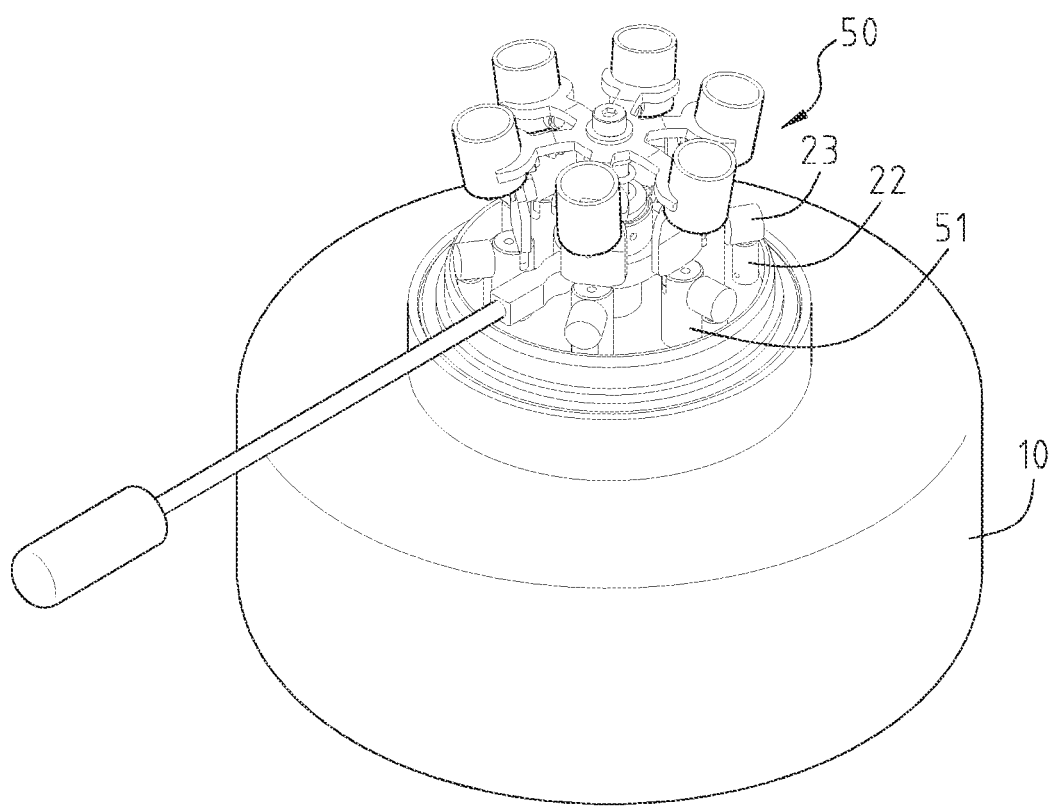
FIG. 7 is a perspective view showing the assembly of a liquid fuel stove according to a third embodiment of the present invention.
Figure 8:
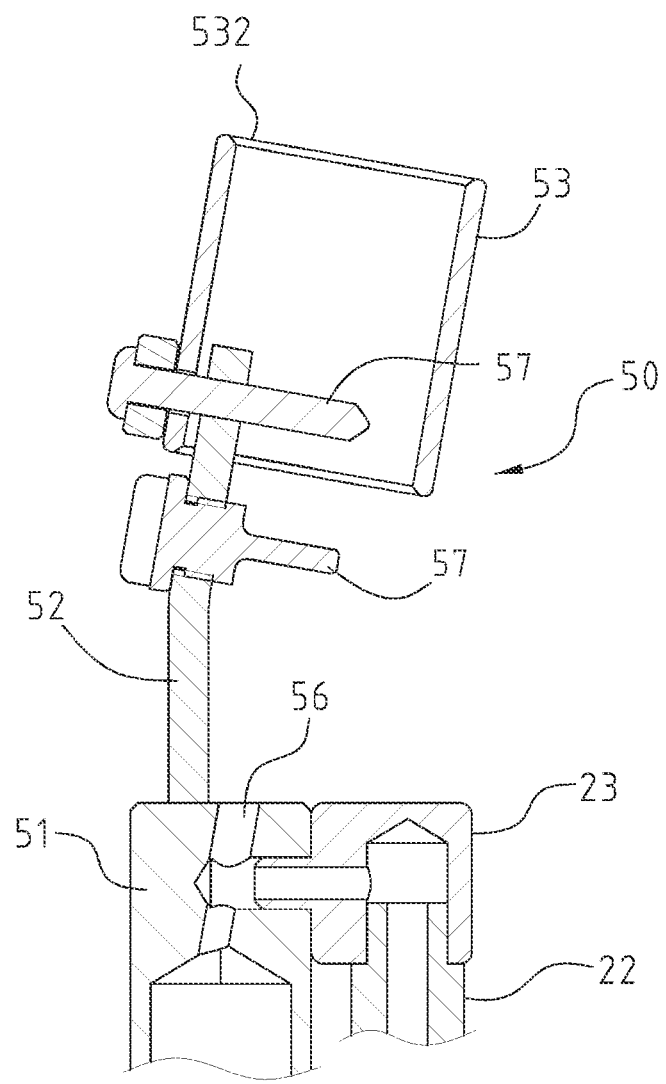
FIG. 8 is a cross sectional view showing the assembly of a part of the liquid fuel stove according to the third embodiment of the present invention.

FIGS. 7 and 8 show a third embodiment a liquid fuel stove. A difference of a liquid fuel stove of a third embodiment from that of the first embodiment may comprise: multiple connection pipes 23 connected with tops of the multiple relief pipes 22 and communicating with the multiple tertiary vapor orifices 56 respectively. The gaseous fuel may spray out of the multiple tertiary vapor orifices 56 from the multiple relief pipes 22 via the multiple connection pipes 23 individually so as to produce the large flame, thus recycling the gaseous fuel from the multiple relief pipes 22 and enhancing utilization rate of the gaseous fuel.

Figure 9:
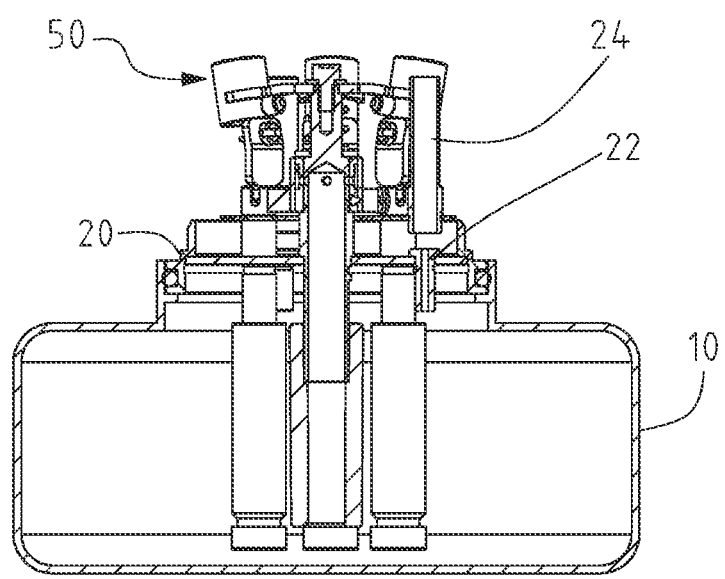
FIG. 9 is a cross sectional view showing the assembly of the liquid fuel stove according to a fourth embodiment of the present invention.

FIG. 9 shows a fourth embodiment of a liquid fuel stove. A difference of a liquid fuel stove of a fourth embodiment from that of the first embodiment may comprise: multiple ducts 24 connected on tops of the multiple relief pipes 22 respectively so that the multiple ducts 24 may guide the gaseous fuel to flow upward via the multiple relief pipes. The multiple ducts 24 may have auxiliary flame formed on tops thereof to avoid producing the flame on the tops of the multiple relief pipes, which would create excess heat that could damage the multiple relief pipes and prevent effective adjustment of the flame.

Figure 10:
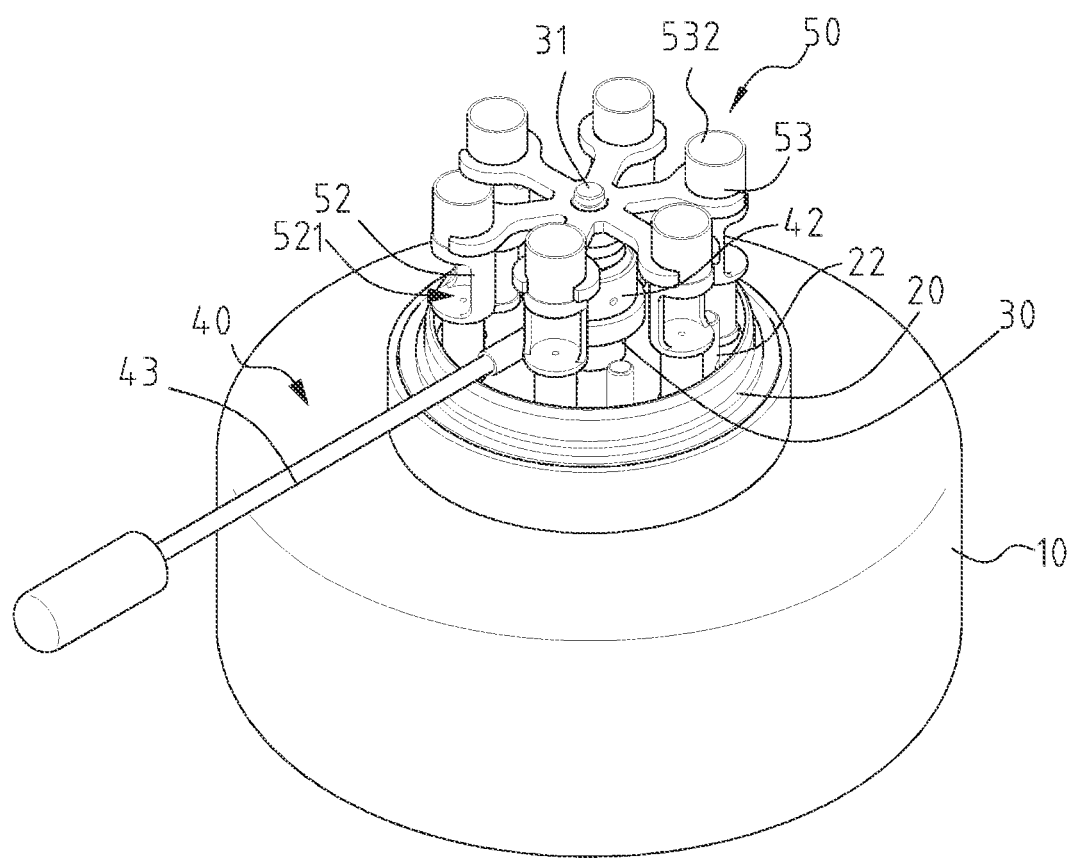
FIG. 10 is a perspective view showing the assembly of a liquid fuel stove according to a fifth embodiment of the present invention.

FIG. 10 shows a fifth embodiment of a liquid fuel stove. A liquid fuel stove of a fifth embodiment is obtained from the first embodiment. In an embodiment conduction plate 52 may be formed to have a curved form. In an embodiment the curved form of the conduction plate 52 may be a half pipe form having on opening 521 facing away from the control flame pipe 30.

While the preferred embodiments of the invention have been set forth for the purpose of disclosure, modifications of the disclosed embodiments of the invention as well as other embodiments thereof may occur to those skilled in the art.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A liquid fuel stove comprising: a container, a base, a relief pipe, a control flame pipe, an adjustment structure, and multiple combustion structures; wherein the container is configured to accommodate liquid fuel and comprising an opening defined on a top thereof, the base is connectable with the container, the control flame pipe and the multiple combustion structures are mounted in the base, the multiple combustion structures are arranged around the control flame pipe, a bottom of the control flame pipe extends inside the container, a top of the control flame pipe extends above the base, and the control flame pipe comprising a heat connection part formed on a top thereof, the control flame pipe further comprising multiple primary vapor orifices passing through a wall of the control flame pipe and located between a top of the base and the heat connection part, wherein the control flame pipe further comprising a primary wick accommodated therein, and the primary wick is made of heat resistant material, the adjustment structure is arranged on the control flame pipe and is configured to adjust small flames; wherein the multiple combustion structures respectively comprising multiple vaporization pipes, multiple conduction plates, and multiple main flame pipes, wherein the multiple vaporization pipes are connected on the base, the multiple conduction plates are coupled with tops of the multiple vaporization pipes respectively, the multiple main flame pipes are connected with tops of the multiple conduction plates individually and have flame ports formed on tops of the multiple main flame pipes respectively, wherein the multiple conduction plates are respectively defined between the multiple vaporization pipes and the multiple main flame pipes which are adjacent to the control flame pipe, such that some of the heat of the small flames is conducted to the multiple vaporization pipes respectively so that the liquid fuel vaporizes and sprays out of multiple tertiary air orifices, each thereof arranged to each of the multiple vaporization pipes, to shield the small flames and the multiple tertiary air orifices and to avoid the small flames being drawn into the multiple main flame pipes individually, wherein bottom of each of the vaporization pipes extends inside the container and has a wick made of heat resistant material, the liquid fuel flows by capillary action into the vaporization pipe where it is heated into a combustible gas, which then flows to the multiple main flame pipes, creating a large flame; wherein the vaporization pipes comprise the wicks, and tertiary vapor orifices arranged at top ends of the vaporization pipes, so as to enhance flowing speeds of gaseous fuel in the vaporization pipes and to absorb combustible vapor into the multiple main flame pipes.

2. The liquid fuel stove as claimed in claim 1, wherein the vaporization pipes have end caps formed on their tops, and the wicks are adjacent to bottoms of the end caps, tertiary vapor orifices pass through the end caps so as to enhance flowing speeds of gaseous fuel in the vaporization pipes and to absorb combustible vapor into the multiple main flame pipes.

3. The liquid fuel stove as claimed in claim 1, wherein the combustion structures have at least one swirl element defined between the main flame pipes and the conduction plate so that the gaseous fuel and the combustion air produce a swirling and expanding flowing phenomenon.

4. The liquid fuel stove as claimed in claim 1, further comprising a circular head arranged on tops of multiple main flame pipes and having a second vapor chamber in a circle shape, wherein the second vapor chamber is in communication with the multiple combustion structures, and the circular head has an air gap formed around an outer rim of a top of the circular head and communicating with the second vapor chamber, such that mixed airs of the gaseous fuel and the combustion air flow into a second chamber from the multiple main flame pipes, and the mixed airs flow out of the air gap.

5. The liquid fuel stove as claimed in claim 1, wherein the adjustment structure includes a regulating part, a fitting ring, and a control pin, wherein the regulating part is rotatably fitted on an outer wall of the control flame pipe, and the regulating part includes multiple apertures passing therethrough and located adjacent to the multiple primary vapor orifices respectively, wherein the fitting ring is fitted with an outer wall of the regulating part, and a vapor chamber is defined between the regulating part and the fitting ring, the adjustment structure includes multiple secondary air orifices passing therethrough, wherein the vapor chamber is in communication with the multiple apertures and the multiple secondary air orifices, and the multiple secondary air orifices face to the multiple combustion structures respectively adjacent to the control flame pipe.

6. The liquid fuel stove as claimed in claim 1, wherein a heat conduction part is defined among the control flame pipe and the multiple main flame pipes, a center of the heat conduction part is fitted on the heat connection part, and the heat conduction part is fitted with the multiple main flame pipes individually.

7. The liquid fuel stove as claimed in claim 1, wherein the control flame pipe further includes a control flame pipe insulation sleeve fitted inside the container, and the multiple vaporization pipes further include multiple vaporization pipe insulation sleeves fitted inside the container.

8. The liquid fuel stove as claimed in claim 1, wherein the liquid fuel stove further comprising multiple relief pipes and wherein multiple ducts connected on tops of the multiple relief pipes respectively so that the multiple ducts guide the gaseous fuel to flow upward via the multiple relief pipes.

9. The liquid fuel stove as claimed in claim 8, wherein the liquid stove further comprising multiple relief pipes and wherein multiple connection pipes are connected with tops of the multiple relief pipes and communicate with the multiple tertiary air orifices respectively, wherein the gaseous fuel sprays out of the multiple tertiary air orifices from the multiple relief pipes via the multiple connection pipes individually.

10. The liquid fuel stove as claimed in claim 1, wherein the relief pipe is rotatably mounted on the base and are in communication with the container.

11. The liquid fuel stove as claimed in claim 1, wherein the control flame pipe and the multiple combustion structures are rotatably mounted in the base.

12. The liquid fuel stove as claimed in claim 1, wherein the multiple combustion structures are oppositely arranged around the control flame pipe.

\* \* \* \* \*